United States Patent [19]

Miyazaki et al.

[11] 4,402,863

[45] Sep. 6, 1983

[54] MAGNESIUM-CONTAINING SOLID

[75] Inventors: Makoto Miyazaki; Takeshi Nomura, both of Ooi; Chihiro Imai, Yokohama; Makoto Yoda, Kawagoe, all of Japan

[73] Assignee: Toa Nenryo Kogyo Kabushiki Kaisha, Tokyo, Japan

[21] Appl. No.: 320,165

[22] Filed: Nov. 10, 1981

[30] Foreign Application Priority Data

Nov. 12, 1981 [JP] Japan .................................. 55-166735

[51] Int. Cl.³ ............................. C08F 4/02; C08F 4/64
[52] U.S. Cl. ................................ 252/429 B; 526/125; 526/142; 526/143; 252/429 C; 252/431 R
[58] Field of Search ............ 252/429 B, 429 C, 431 R

[56] References Cited

U.S. PATENT DOCUMENTS

| | | | |
|---|---|---|---|
| 3,381,047 | 4/1968 | Eleuterio et al. | ............ 252/429 B X |
| 3,784,481 | 1/1974 | Lassau et al. | ............... 252/429 B X |
| 4,220,554 | 9/1980 | Scata et al. | ..................... 252/429 B |
| 4,232,139 | 11/1980 | Minami et al. | ............... 252/429 B X |
| 4,335,015 | 6/1982 | Imai et al. | ......................... 252/429 B |
| 4,370,257 | 1/1983 | Imai et al. | ......................... 252/429 B |

*Primary Examiner*—Patrick Garvin

*Attorney, Agent, or Firm*—M. B. Kurtzman

[57] ABSTRACT

According to this invention, there is provided a magnesium-containing solid, obtained by contacting the reaction product of (1):

a magnesium-containing solid, obtained by contacting the reaction product of:
  (a) metallic magnesium;
  (b) a halogenated hydrocarbon of the general formula RX in which R stands for an alkyl, aryl or cycloalkyl group having 1 to 20 carbon atoms, and X stands for a halogen atom; and
  (c) an alkoxy compound of the general formula $X'_mC(OR')_{4-m}$ in which X' stands for a hydrogenor halogen atoms, or an alkyl, aryl or a cycloalkyl group having 1 to 10 carbon atoms, R' stands for an alkyl, aryl or cycloalkyl group having 1 to 20 carbon atoms and m is 0, 1 or 2, with (2) an organic aluminum compound.

The magnesium-containing solid is employed as a carrier for a transition metal halide. The supported transition metal halide in combination with an aluminum alkyl cocatalyst such as aluminum triethyl is usefully employed for the polymerization of olefins.

15 Claims, No Drawings

MAGNESIUM-CONTAINING SOLID

BACKGROUND OF THE INVENTION

This invention relates to a novel magnesium-containing solid which is useful as a carrier for various kinds of catalysts, particularly a catalyst for polymerization of ethylene and alpha-olefins (hereinafter referred to simply as the olefins). More particularly, it is concerned with a novel magnesium-containing solid which is useful as a carrier for the Ziegler catalyst for polymerization of olefins, and a component of an olefin polymerization catalyst comprising such a solid, particularly in the form of uniform particles.

Various kinds of substances have hitherto been proposed for use as the carrier for a Ziegler catalyst for polymerization of olefins. A solid containing magnesium is useful as a catalyst for polymerization of olefins, and particularly as a carrier for any such catalyst. Various methods have been proposed for obtaining uniform particles of a solid containing magnesium.

For example, it has been proposed to obtain spherical particles by spraying an aqueous solution of magnesium chloride, or molten $MgCl_2.6H_2O$ as disclosed in U.S. Pat. Nos. 3,953,414, 4,111,835, and British Pat. No. 2,006,227, or obtain appropriate particles by classifying particles of magnesium chloride powder as disclosed in Japanese Patent Application Laid-Open No. 127185/76.

For manufacturing a solid containing magnesium, it has, for example, been proposed to contact metallic magnesium, a halogenated hydrocarbon and an electron donative compound such as alcohol as disclosed in Japanese Patent Application Laid-Open No. 64586/76, or react an organic metal compound with an orthosilicic ester, or react metallic magnesium, an orthosilicic ester and an organic halide with one another as disclosed in U.S. Pat. No. 4,220,554.

None of these methods has, however, been found useful for the manufacture of a carrier for a catalyst which is fully satisfactory in all aspects of particle properties, catalytic activity and stereoregularity.

The inventors of this invention have accomplished this invention as a result of their energetic research efforts to obtain a carrier which is composed of uniform particles having a large surface area, and which provides a polymer having high degrees of activity and stereoregularity for a catalyst for polymerization of olefins.

DISCLOSURE OF THE INVENTION

According to a first aspect of this invention, there is provided a magnesium-containing solid obtained by contacting the reaction product of (1):

(A) metallic magnesium;

(B) a halogenated hydrocarbon of the general formula RX in which R stands for an alkyl, aryl or cycloalkyl group having 1 to 20 carbon atoms, and X stands for a halogen atom; and (C) an alkoxy compound of the general formula $X'_mC(OR')_{4-m}$ in which $X'$ stands for a hydrogen or halogen atom, or an alkyl, aryl or cycloalkyl group having 1 to 10 carbon atoms, $R'$ stands for an alkyl, aryl or cycloalkyl group having 1 to 20 carbon atoms, and m is 0, 1 or 2, with (2) an organic aluminum compound.

Metallic Magnesium

It is preferable to use metallic magnesium in the form of a powder or chips, though any other form may be used. Before it is used, it is desirable to wash metallic magnesium with an inert hydrocarbon, such as a saturated aliphatic, alicyclic or aromatic hydrocarbon having 6 to 8 carbon atoms, and dry it under heat in the presence of an inert gas, such as nitrogen.

Halogenated Hydrocarbon

It is preferable to use a chlorinated or brominated hydrocarbon which contains an alkyl, aryl or cycloalkyl group having 1 to 8 carbon atoms. Specific examples thereof include methyl, ethyl, isopropyl, n-butyl, n-octyl or cyclohexyl chloride or bromide, chlorobenzene, and o-chlorotoluene.

Alkoxy Compound

Examples of the alkoxy compounds of the general formula $X'_mC(OR')_{4-m}$ are listed below when m is 0, 1 and 2, respectively:

(1) Orthocarbonic acid esters of the general formula $C(OR')_4$. More specifically, they include methyl orthocarbonate $C(OCH_3)_4$, ethyl orthocarbonate $C(OC_2H_5)_4$, propyl orthocarbonate $C(OC_3H_7)_4$, butyl orthocarbonate $C(OC_4H_9)_4$, isobutyl orthocarbonate $C(O\text{---}i\text{---}C_4H_9)_4$, hexyl orthocarbonate $C(OC_6H_{13})_4$, and octyl orthocarbonate $C(OC_8H_{17})_4$.

(2) Orthoesters of the general formula $X'C(OR')_3$ and their derivatives. Specific examples thereof, when $X'$ stands for a hydrogen atom, include methyl orthoformate $HC(OCH_3)_3$, ethyl orthoformate $HC(OC_2H_5)_3$, propyl orthoformate $HC(OC_3H_7)_3$, butyl orthoformate $HC(OC_4H_9)_3$, isobutyl orthoformate $HC(O\text{---}i\text{---}C_4H_9)_3$, hexyl orthoformate $HC(OC_6H_{13})_3$, octyl orthoformate $HC(OC_8H_{17})_3$, and phenyl orthoformate $HC(OC_6H_5)_3$. Examples of compounds when $X'$ stands for an alkyl, aryl or cycloalkyl group are methyl orthoacetate $CH_3C(OCH_3)_3$, ethyl orthoacetate $CH_3C(OC_2H_5)_3$, methyl orthopropionate $CH_3CH_2C(OCH_3)_3$, ethyl orthopropionate $CH_3CH_2C(OC_2H_5)_3$, and compounds represented by formulas: $C_6H_{11}C(OC_2H_5)_3$, $C_6H_5C(OC_2H_5)_3$, $C_6H_5C(OCH_3)_3$, $C_6H_5C(OC_3H_7)_3$, $C_7H_8C(OC_2H_5)_3$ and $C_8H_{11}C(OC_2H_5)_3$. Examples of compounds in which $X'$ stands for an alkyl, aryl or cycloalkyl group having a hydrogen atom replaced by a halogen atom, include ethyl orthobromoacetate $CH_2BrC(OC_2H_5)_3$, ethyl orthochloroacetate $CH_2ClC(OC_2H_5)_3$, ethyl ortho alpha-bromopropionate $CH_3CHBrC(OC_2H_5)_3$ and ethyl ortho alpha-chloropropionate $CH_3CHClC(OC_2H_5)_3$. If $X'$ stands for a halogen atom, examples of the compounds include methyl orthochloroformate $ClC(OCH_3)_3$, ethyl orthochloroformate $ClC(OC_2H_5)_3$, propyl orthochloroformate $ClC(OC_3H_7)_3$, isobutyl orthochloroformate $ClC(O\text{---}i\text{---}C_4H_9)_3$, octyl orthochloroformate $ClC(OC_8H_{17})_3$, phenyl orthochloroformate $ClC(OC_6H_5)_3$, and ethyl orthobromoformate $BrC(OC_2H_5)_3$.

(3) Acetals of the general formula $X'_2C(OR')_2$ and their derivatives. More specifically, they include ethylidene dimethyl ether $CH_3(CH(OCH_3)_2$, ethylidene diethyl ether $CH_3CH(OC_2H_5)_2$, methylal $CH_2(OCH_3)_2$, methylene diethyl ether $CH_2(C_2H_5)_2$, monochloroacetal $CH_2ClCH(OC_2H_5)_2$, dichloroacetal $CHCl_2CH(OC_2H_5)_2$, trichloroacetal $CCl_3CH(OC_2H_5)_2$, monobromoacetal $CH_2BrCH(OC_2H_5)_2$, monoiodoacetal $CH_2ICH(OC_2H_5)_2$, and benzaldehyd diethyl acetal $C_6H_5CH(OC_2H_5)_2$.

It is preferable to use orthoformic esters, particularly alkyl esters having 1 to 8 carbon atoms, such as methyl orthoformate, ethyl orthoformate and butyl orthoformate.

The magnesium-containing solid can be obtained by contacting an alkoxy compound, metallic magnesium and a halogenated hydrocarbon with one another. Any method may be used for contacting them without limitation in particular. It is, for example, possible to adopt any of the following methods:

(1) Contacting them with one another simultaneously;

(2) Contadting metallic magnesium and a halogenated hydrocarbon with each other, and then, contacting them with an alkoxy compound, or contacting with an alkoxy compound a compound obtained by contacting metallic magnesium and a halogenated hydrocarbon, for example, any compound known as a Grignard reagent, including $ClMgCH_3$, $ClMgC_2H_5$, $ClMgC_3H_7$, $ClMgC_4H_9$, $ClMgi\text{-}C_4H_9$, $ClMgC_6H_{13}$, $ClMgC_8H_{17}$, $BrMgC_2H_5$, $BrMgC_4H_9$, $BrMgi\text{-}C_4H_9$, $IMgC_4H_9$, $ClMgC_6H_5$ and $BrMgC_6H_5$;

(3) Adding a solution of a halogenated hydrocarbon into a solution of an alkoxy compound in which metallic magnesium is suspended; or (4) Contacting an alkoxy compound with a halogenated hydrocarbon, and them, adding metallic magnesium. The method as set forth at (3) is, among others, preferred.

It is desirable to employ an alkoxy compound and metallic magnesium in such a proportion that the alkoxy compound may contain at least one, and preferably 3 to 5, OR′ groups per magnesium atom in the metallic magnesium. In other words, it is desirable to employ at least 0.5 mol, and preferably 1.5 to 2.5 mols, of an alkoxy compound, if it is a compound of the formula $X'_2C(OR')_2$, or at least $\frac{1}{3}$ mol, and preferably 1 to 5/3 mols, of an alkoxy compound if it is a compound of the formula $X'C(OR')_3$, per gram atom of magnesium. It is desirable to use 1 to 2 mols of a halogenated hydrocarbon per gram atom of magnesium.

The contacting reaction may be carried out under stirring at a temperature of 40° C. to 250° C., preferably 60° C. to 120° C., in one to 10 hours. The reaction can be caused to take place in the presence of an inert hydrocarbon used for drying magnesium, for instance, an aliphatic, alicyclic or aromatic hydrocarbon having 6 to 8 carbon atoms. It is, however, not desirable to use any oxygen-containing compound, such as ether or alcohol.

In order to promote the reaction, it is possible to use iodine, or an inorganic halide such as alkyl iodide, calcium chloride, copper chloride, manganese chloride, or a hydrogen halide.

The solid obtained as the reaction product is separated from the reaction system, and washed with an inert hydrocarbon if required, and dried if required, to yield a magnesium-containing solid according to this invention.

The magnesium-containing solid thus obtained is composed of highly uniform particles having a specific surface area of at least 200 m²/g when determined by the BET method, and a pore volume of at least 0.15 cc/g. The solid contains 5 to 25% by weight of magnesium atoms, and 3 to 70% by weight of halogen atoms, while the balance is, for example, an organic compound.

The magnesium-containing solid is thereafter contacted with an organic aluminum compound to yield a magnesium-containing solid which exhibits excellent properties when used as a carrier for an olefin polymerization catalyst.

The organic aluminum compounds which can be contacted with the magnesium-containing solid are represented by the general formula $R_nAlX_{3-n}$ in which R stands for an alkyl or aryl group, X stands for a halogen or hydrogen atom, or an alkoxy group, and n is a number from 1 to 3. It is preferable to use, for example, an alkylaluminum compound having 1 to 18, preferably 2 to 6, carbon atoms, such as trialkylaluminum, dialkylaluminum monohalide, monoalkylaluminum dihalide, alkylaluminum sesquihalide, dialkylaluminum monoalkoxide or dialkylaluminum monohydride, or a mixture of complex compound thereof. More specifically, it is preferable to use trialkyaluminum such as trimethylaluminum, triethylaluminum, tripropylaluminum, triisobutylaluminum or trihexylaluminum, dialkylaluminum monohalide such dimethylaluminum chloride, diethylaluminum chloride, diethylaluminum bromide, diethylaluminum iodide or diisobutylaluminum chloride, monoalkylaluminum dihalide such as methylaluminum dichloride, ethylaluminum dichloride, ethylaluminum dibromide, ethylaluminum diiodide or isobutylaluminum dichloride, alkylaluminum sesquihalide such as ethylaluminum sesquichloride, dialkylaluminum monoalkoxide such as dimethylaluminum methoxide, diethylaluminum ethoxide, diethylaluminum phenoxide, dipropylaluminum ethoxide, diisobutylaluminum ethoxide or diisobutylaluminum phenoxide, or dialkylaluminum hydride such as dimethylaluminum hydride, diethylaluminum hydride, dipropylaluminum hydride or diisobutylaluminum hydride. It is particularly preferable to employ diethylaluminum chloride.

It is desirable to employ 0.005 to 20 gram mols, preferably 0.01 to 5 gram mols, of any such organic aluminum compound per gram atom of magnesium in the magnesium-containing solid.

The magnesium-containing solid may be contacted with any such organic aluminum compound if the magnesium-containing solid, or a suspension thereof in an inert solvent, for example, a hydrocarbon such as hexane, heptane, octane, cyclohexane, benzene, toluene or xylene, is mixed with the organic aluminum compound, or a solution thereof in any such inert solvent. Their contact reaction is carried out at a temperature of $-10°$ C. to 100° C., preferably 20° C. to 80° C. The higher part of this range is advantageous for promoting the reaction. The reaction is continued for one minute to 10 hours, preferably for five minutes to three hours.

The magnesium-containing solid which has been contacted with the organic aluminum compound is separated from the reaction system, and washed with an inert solvent of which examples have hereinabove been listed, if required, and dried, if required, to yield a magnesium-containing solid according to this invention. The solid thus obtained is composed of uniform particles, and exhibits excellent properties when used as a carrier for an olefin polymerization catalyst. It shows a particularly high activity when used as a carrier for an ethylene polymerization catalyst, and contributes, therefore, to the manufacture of polyethylene which is composed of uniform particles.

According to a second aspect of this invention, there is provided a catalyst for polymerization of olefins comprising a titanium compound supported on a magnesium-containing solid obtained by contacting the reaction product of (1):

(A) metallic magnesium;

(B) a halogenated hydrocarbon of the general formula RX in which R stands for an alkyl, aryl or cycloalkyl group having 1 to 20 carbon atoms, and X stands for a halogen atom; and (C) an alkoxy compound of the general formula $X'_m C(OR')_{4-m}$ in which $X'$ stands for a hydrogen or ahlogen atom, or an alkyl, aryl or cycloalkyl group having 1 to 10 carbon atoms, $R'$ stands for an alkyl, aryl or cycloalkyl group having 1 to 20 carbon atoms, and m is 0, 1 or 2, with (2) an organic aluminum compound. In other words, there is provided a catalyst for polymerization of olefins comprising a titanium compound supported on a magnesium-containing solid obtained according to the first aspect of this invention.

Any titanium compound usually used for forming a catalyst for polymerization of olefins may be used for this invention, but it is preferable to employ a halide of trivalent or tetravalent titanium, or an organic compound of titanium, such as a titanium halide, alkoxytitanium or an alkoxytitanium halide. More specifically, it is suitable to use, for example, titanium tetrachloride, titanium tetrabromide, trichloroethoxytitanium, trichlorobutoxytitanium, dichlorodiethoxytitanium, dichlorodiphenoxytitanium, chlorotriethoxytitanium, chlorotributoxytitanium, tetrabutoxytitanium, or titanium trichloride. It is preferable to use, among others, titanium tetrachloride, trichloroethoxytitanium, dichlorodibutoxytitanium, dichloridiphenoxytitanium, or other tetravalent titanium halides. Titanium tetrachloride is the most preferable.

Although any customary method may be used for applying a titanium compound to a magnesium-containing solid, it is particularly suitable to mix the solid or a suspension thereof in an inert solvent, for example, a hydrocarbon such as hexane, heptane, octane, cyclohexane, benzene, toluene or xylene, with the titanium compound or a solution or suspension thereof in any such inert solvent, and maintain them in contact with each other at a temperature of 0° C. to 200° C. for five minutes to 10 hours, and preferably at a temperature of 30° C. to 120° C. for 20 minutes to five hours.

It is desirable to employ at least 0.01, and preferably 0.1 to 100, gram atoms of any such titanium compound per gram atom of magnesium in the solid. It is not necessary to finish application of the titanium compound at one time, but it is all right to repeat it twice or more times.

The magnesium-containing solid on which the titanium compound has been supported as hereinabove described is separated from the reaction system, and washed, if required, with an inert solvent such as hexane, heptane, octane, cyclohexane, benzene, toluene, xylene or kerosene, and dried if required, to provide a catalyst according to this invention.

The catalyst of this invention together with an organoaluminum co-catalyst provides an olefin polymerization catalyst of high activity.

It is possible to use any organic aluminum compound that is usually used as a promoter for a Ziegler catalyst. For example, it is possible to use any organic aluminum compound of the general formula $R_n AlX_{3-n}$ with which the magnesium-containing solid has been contacted as hereinabove described.

It is, however, preferable to use trialkyaluminum, particularly triethylaluminum or triisobutylaluminum. Trialkylaluminum may be used alone, or with any other organic aluminum compound, such as diethylaluminum chloride, ethylaluminum dichloride, ethylaluminum sesquichloride, diethylaluminum ethoxide and diethylaluminum hydride, which are all easily available in industry, or a mixture or complex compound thereof.

It is further possible to employ an electron donative compound in combination in order to obtain a polymer having improved stereoregularity. For this purpose, it is possible to use a carboxylic acid, a derivative thereof, an alcohol, an ether, a ketone, an amine, an amide, a nitrile, an aldehyde, an alcoholate, a compound of phosphorus, arsenic or antimony bonded to an organic group by carbon or oxygen, a phosphamide, a thioether, a thioester, or a carbonic acid ester. It is, however, preferable to use an alkyl ester of an aromatic carboxylic acid, particularly an alkyl ester of benzoic acid, or a nuclear substitution product of benzoic acid, such as p-methylbenzoic acid or p-methoxybenzoic acid, having 1 to 8 carbon atoms. The electron donative compound may be incorporated either when the organic aluminum compound is used in combination with the catalyst, or after it has been contacted with the organic aluminum compound.

It is desirable to employ 1 to 2,000 and preferably 10 to 500, mols of any such organic aluminum compound per gram atom of titanium in the catalyst of this invention.

When both the organic aluminum compound and the electron donative compound are employed, it is possible to employ 0.1 to 50, and preferably 1 to 25, gram atoms of aluminum in the organic aluminum compound per mol of the electron donative compound.

The homopolymerization and copolymerization of olefins may be carried out in the same way when the catalyst of this invention is used, as when an ordinary Ziegler catalyst is used. The catalyst of this invention is, therefore, very useful for the homopolymerization of olefins, and the random or block copolymerization of different olefins. More specifically, the catalyst of this invention is useful for polymerizing ethylene, and alpha-olefins such as propylene, butene-1, pentene-1, 4-methyl-pentene-1, hexene-1 and octene-1. The catalyst can particularly advantageously be used for the homopolymerization of ethylene, and the copolymerization of ethylene and alpha-olefins.

The reaction for polymerization may be carried out either in the vapor phase, or in the liquid phase. The liquid phase polymerization may be carried out in an inert hydrocarbon such as normal butane, isobutane, normal pentane, isopentane, hexane, heptane, octance, cyclohexane, benzene, toluene or xylene, or a liquid monomer. The temperature for polymerization is in the range of −80° C. to 150° C., preferably 40° C. to 120° C., and the polymerization pressure may, for example, be in the range of 1 to 60 atm. It is possible to adjust the molecular weight of the polymer to be obtained, if polymerization is carried out in the presence of hydrogen, or any other known agent for controlling the molecular weight. The copolymerization of olefins may be carried out by employing up to 30%, and preferably 0.3 to 15%, by weight of one olefin to the other. The catalyst of this invention is useful for either continuous or batch polymerization under ordinary conditions.

The magnesium-containing solid of this invention is composed of uniform spherical particles having an average diameter which is generally variable between 10 to 40 microns, and having a narrow range of particle size distribution. The coefficient of variation in the particle size distribution of the magnesium-containing solid of this invention, which is obtained by dividing the standard deviation of its particle size distribution by its average particle diameter, is not higher than 0.3. The magnesium-containing solid of this invention has a large surface area, and the olefin polymerization catalyst comprising a titanium compound supported on the solid has a specific surface area of at least 200 m²/g, and a pore volume exceeding 0.3 cc/g. Thus, the magnesium-containing solid of this invention provides a catalyst having a high degree of activity for polymerization of olefins, and which makes it possible to manufacture a polymer composed of uniform particles.

EXAMPLES

The invention will now be described more specifically with reference to examples thereof, and applied examples in which the products of this invention were used for various polymerization purposes. It is to be understood that these examples do not limit the scope of this invention in any way. In the examples, and applied examples, the percentages (%) are shown by weight unless otherwise noted.

The melt index (MI) of an ethylene polymer was determined by applying a load of 2.16 kg at a temperature of 190° C. in accordance with the provisions of ASTM D1238. The flow ratio (FR) was obtained by dividing the melt index determined at a temperature of 190° C. and a load of 21.6 kg (HLMI) by the melt index at 190° C. and 2.16 kg (MI). It provides a measure of the molecular weight distribution of a polymer.

The melt flow rate (MFR) of a propylene polymer was determined in accordance with the provisions of ASTM D1238. The heptane insoluble (HI) showing the percentage of the crystalline portion of a polymer represents the residue obtained after extraction for six hours by a Soxhlet extraction apparatus with boiling n-heptane.

The catalytic activity Kc is expressed by the quantity (g) of polymer formation per gram of the catalyst, and Kt by the quantity (kg) of polymer formation per gram of titanium in the catalyst. The specific activity of the catalyst is expressed by the quantity (g) of polymer formation per gram of the catalyst, hour of polymerization, and unit partial pressure (kg/cm²) of the monomers during polymerization. The bulk density was determined in accordance with Method A specified in ASTM D1895-69. The particle size distribution of the polymer was determined by a W. S. Tyler standard sieve.

The specific surface area (SA), pore volume (PV) and mean pore radium (MPR) of the magnesium-containing solid and the catalyst were determined by a Carlo Erba's SORPTOMATIC 1810 apparatus. The particle size distribution of the catalyst was determined by a Seishin Kogyo's SKN 500 light transmission type apparatus.

EXAMPLE 1

Preparation of a Magnesium-Containing Solid

A one-liter capacity reactor having a reflux condenser was fed, in the presence of nitrogen gas, with 12.8 g (0.53 mol) of chips of metallic magnesium having a purity of 99.5% and an average particle diameter of 1.6 mm, and 250 ml of n-hexane, and they were stirred at 68° C. for one hour. Then, the metallic magnesium was taken out of the reactor, and vacuum dried at 68° C., whereby preactivated metallic magnesium was obtained.

A suspension of the metallic magnesium was prepared by adding 88 ml (0.53 mol) of ethyl orthoformate and 0.1 ml of a promoter composed of a methyl iodide solution containing 10% of iodine, and maintained at 55° C. Then, 5 ml of a solution containing 80 ml (0.8 mol) of n-butyl chloride in 100 ml of n-hexane were dropped into the suspension, and after the suspension was stirred for 50 minutes, the remaining solution was dropped into the suspension over a period of 80 minutes. The reaction was continued at 70° C. for four hours under stirring, whereby a solid reaction product was obtained.

The reaction product was washed six times with 300 ml each of n-hexane at 50° C., and vacuum dried at 60° C. for one hour, whereby 55.6 g of a magnesium-containing solid in the form of a white powder were obtained. The solid was found to contain 22.5% of magnesium and 34.0% of chlorine. It has a specific surface area (SA) of 230 m²/g, a pore volume (PV) of 0.15 cc/g, and a mean pore radium (MPR) of 15 Å.

Preparation of a Catalyst

Titanium Tetrachloride Treatment

A 300 ml capacity reactor having a reflux condenser was fed, in the presence of nitrogen gas, with 5.5 g of the magnesium-containing solid prepared as hereinabove described, and 50 ml of titanium tetrachloride. After they had been stirred for three hours at 90° C., the excess titanium tetrachloride was removed. Then, a solid substance was separated by filtration at 90° C., washed six times with 200 ml each of n-hexane at 65° C., and dried at 50° C. for one hour under reduced pressure to yield 6.9 g of a catalyst containing 6.5% of titanium, and having a specific surface area of 396 m²/g and a pore volume of 0.313 cc/g.

EXAMPLE 2

Preparation of a Catalyst

Diethylaluminum Chloride Treatment 10.3 g of the magnesium-containing solid obtained in Example 1 and 200 ml of n-heptane were placed in the reactor employed in Example 1 in the presence of nitrogen gas, and mixed with each other while they were being stirred. Then, 11.6 g of diethylaluminum chloride were added, and the solid was contacted therewith for one hour at 65° C. under stirring. The solid substance thereby obtained was separated, and washed three times with 200 ml each of n-hexane at 65° C.

Titanium Tetrachloride Treatment

Then, 100 ml of titanium tetrachloride were added to the solid substance, and after they had been stirred for three hours at 90° C., the excess titanium tetrachloride was removed. The solid substance was separated by filtration at 90° C., washed six times with 200 ml each of n-hexane at 65° C., and dried at 50° C. for one hour under reduced pressure to yield 10.4 g of a catalyst having a titanium content of 4.9%, a S.A. of 342 m²/g and a P.V. of 0.34 cc/g.

EXAMPLE 3

Preparation of a Magnesium-Containing Solid

The procedures of Example 1 were repeated, except that methyl orthobenzoate was used instead of ethyl orthoformate, for preparing a magnesium-containing solid. The solid had a magnesium content of 24.1%, chlorine content of 38.5%, S.A. of 241 m²/g, a P.V. of 0.16 cc/g and a M.P.R. of 12 Å.

Preparation of a Catalyst

The procedures of Example 2 were repeated for preparing a catalyst by the diethylaluminum chloride and titanium tetrachloride treatment of the magnesium-containing solid obtained as hereinabove described. The catalyst had a titanium content of 5.1%, a S.A. of 330 m$^2$/g and a P.V. of 0.33 cc/g.

APPLIED EXAMPLE 1

Polymerization of Ethylene

A 1.5 liter capacity stainless steel (SUS 32) autoclave equipped with a stirrer was fed with 10.9 mg of the catalyst obtained in Example 1, 0.7 mmol of triisobutylaluminum and 700 g of isobutane, and the temperature of the reaction system was raised to 85° C. Then, hydrogen was introduced until a hydrogen partial pressure of 2.0 kg/cm$^2$ was reached, and ethylene was introduced until an ethylene partial pressure of 5.0 kg/cm$^2$ was obtained. Polymerization was carried out for 80 minutes, while ethylene was being supplied continuously so that the reaction system might obtain a constant total pressure. After polymerization had been completed, the solvent and the unreacted ethylene was removed from the reaction system, and a white powdered polymer was collected. It was dried at 70° C. for 10 hours under reduced pressure to yield 187 g of a polyethylene powder having a melt index (MI) of 4.15, a flow ratio (FR) of 30.2 and a bulk density of 0.19 g/cc. Thus, the catalyst showed an activity Kc of 17,160, and a specific activity of 2,570. The particle size distribution of the polyethylene powder was as shown in Table 2 below.

APPLIED EXAMPLE 2

Polymerization of Ethylene

The procedures of Applied Example 1 were repeated, except that 21.1 mg of the catalyst obtained in Example 2 were used, and that polymerization of ethylene was carried out for 60 minutes. The results shown in Tables 1 and 2 below were obtained.

APPLIED EXAMPLE 3

Polymerization of ethylene was carried out as described in Applied Example 2, except that the catalyst obtained in Example 3 was employed. The results shown in Table 1 were obtained.

TABLE 1

| Applied Example | Catalytic Activity Kc | Specific Activity | MI | FR | Bulk Density |
|---|---|---|---|---|---|
| 2 | 10,900 | 2,180 | 0.43 | 45.5 | 0.30 |
| 3 | 9,770 | 1,950 | 0.33 | 39.4 | 0.30 |

TABLE 2

| | Particle Diameter (microns) | | | | | |
|---|---|---|---|---|---|---|
| | 1,680 or above | 840 or above, but below 1,680 | 420 or above, but below 840 | 149 or above, but below 420 | 53 or above, but below 149 | Below 53 |
| Applied Example 1 | 0 | 4.0% | 56.7% | 37.3% | 2.0% | 0 |
| Applied Example 2 | 0 | 25.7% | 65.3% | 7.6% | 1.4% | 0 |

What is claimed is:

1. A magnesium-containing solid obtained by contacting the reaction product of (1):
   (a) metallic magnesium;
   (b) a halogenated hydrocarbon of the general formula RX in which R stands for an alkyl, aryl or cycloalkyl group having 1 to 20 carbon atoms, and X stands for a halogen atom; and
   (c) an alkoxy compound of the general formula X'$_m$C(OR')$_{4-m}$ in which X' stands for a hydrogen or halogen atom, or an alkyl, aryl or cycloalkyl group having 1 to 10 carbon atoms, R' stands for an alkyl, aryl or cycloalkyl group having 1 to 20 carbon atoms, and m is 0, 1 or 2, with (2) an organic aluminum compound.

2. The magnesium-containing solid of claim 1 wherein R is an alkyl, aryl or cycloalkyl group having 1 to 8 carbon atoms, m is 1, R' is an alkyl group having 1 to 8 carbon atoms and the organic aluminum compound is represented by the formula R$_n$AlX$_{3-n}$ wherein R stands for an alkyl or aryl group having 1 to 18 carbon atoms, X stands for a halogen or hydrogen atom, or an alkoxy group, and n is a number from 1 to 3.

3. The magnesium-containing solid of claim 2 wherein the halogenated hydrocarbon is n-butyl chloride, the alkoxy compound is one of ethyl orthoformate or methyl orthoformate and the organoaluminum compound is diethylaluminum chloride.

4. A catalyst component for polymerization of olefins comprising a titanium compound supported on the magnesium-containing solid of claim 1.

5. A catalyst component for polymerization of olefins comprising a titanium compound supported on a magnesium-containing solid of claim 2.

6. A catalyst component for the polymerization of olefins comprising a titanium compound supported on a magnesium-containing solid of claim 3.

7. A catalyst component of claim 4 wherein the titanium compound is a trivalent or tetravalent titanium compound selected from titanium halides, alkoxy titanium compounds or alkoxy titanium halides.

8. A catalyst component of claim 7 wherein the titanium compound can be one of titanium tetrachloride, titanium tetrabromide, trichloroethoxy titanium, trichlorobutoxy titanium, dichlorodiethoxy titanium, dichlorodiphenoxy titanium, chlorotriethoxy titanium, chlorotributoxy titanium, tetrabutoxy titanium, or titanium trichloride.

9. A catalyst component of claim 8 wherein the titanium compound is one of titanium tetrachloride, trichloroethoxy titanium, dichlorodibutoxy titanium, dichlorodiphenoxy titanium.

10. A catalyst system for the polymerization of olefins comprising the catalyst component of claim 4 and an organoaluminum compound represented by the general formula R$_n$AlX$_{3-n}$ wherein R stands for an alkyl or aryl group having 1 to 18 carbon atoms, X stands for halogen or hydrogen atom and n is a number from 1 to 3.

11. A catalyst system for the polymerization of olefins comprising the catalyst component of claim 5 and an organoaluminum compound represented by the general formula $R_nAlX_{3-n}$ wherein R stands for an alkyl or aryl group having 1 to 18 carbon atoms, X stands for the halogen or hydrogen atom and n is a number from 1 to 3.

12. A catalyst system for the polymerization of olefins comprising the catalyst component of claim 6 and an organoaluminum compound represented by the general formula $R_nAlX_{3-n}$ wherein R stands for an alkyl or aryl group having 1 to 18 carbon atoms, X stands for halogen or hydrogen atom and n is a number from 1 to 3.

13. A catalyst system for the polymerization of olefins comprising the catalyst component of claim 7 and an organoaluminum compound represented by the general formula $R_nAlX_{3-n}$ wherein R stands for an alkly or aryl group having 1 to 18 carbon atoms, X stands for halogen or hydrogen atom and n is a number from 1 to 3.

14. A catalyst system for the polymerization of olefins comprising the catalyst component of claim 8 and an organoaluminum compound represented by the general formula $R_nAlX_{3-n}$ wherein R stands for an alkyl or aryl group having 1 to 18 carbon atoms, X stands for halogen or hydrogen atom and n is a number from 1 to 3.

15. A catalyst system for the polymerization of olefins comprising the catalyst component of claim 9 and an organoaluminum compound represented by the general formula $R_nAlX_{3-n}$ wherein R stands for an alkyl or aryl group having 1 to 18 carbon atoms, X stands for halogen or hydrogen atom and n is a number from 1 to 3.

* * * * *